Sept. 24, 1963  W. W. BALLARD ETAL  3,104,818
VALVE CONTROLLED VARIABLE PATTERN LAWN SPRINKLER
Filed March 23, 1962  5 Sheets-Sheet 1

FIG.1.

INVENTORS
WALTER W. BALLARD
RUSSELL B. NELSON

Cushman, Darby & Cushman
ATTORNEYS

Sept. 24, 1963  W. W. BALLARD ETAL  3,104,818
VALVE CONTROLLED VARIABLE PATTERN LAWN SPRINKLER
Filed March 23, 1962  5 Sheets-Sheet 4

INVENTORS
WALTER W. BALLARD
BY RUSSELL B. NELSON
Cushman, Darby & Cushman
ATTORNEYS 3,104,818
VALVE CONTROLLED VARIABLE PATTERN
LAWN SPRINKLER
Walter W. Ballard and Russell B. Nelson, Peoria, Ill.,
assignors to L. R. Nelson Mfg. Co., Inc., Peoria, Ill.,
a corporation of Illinois
Filed Mar. 23, 1962, Ser. No. 181,986
13 Claims. (Cl. 239—97)

This invention relates to lawn sprinklers and more particularly to a lawn sprinkler which is capable of being easily adjusted to obtain a wide variety of different water distribution patterns.

Various types of lawn sprinklers have been known and have been in widespread use for a number of years. For example, rotary lawn sprinklers have enjoyed considerable popularity and the patented literature contains many proposals relating to rotary lawn sprinklers in addition to those structures which have been offered on the commercial market. Rotary lawn sprinklers are usually limited to a circular pattern and some embodiments include means for varying the water distribution and size of the circular pattern.

There have also been proposed in the patented literature and offered on the commercial market various stationary water distribution heads which can be adjusted to provide a greater variety in the shape of the water distribution pattern.

An object of the present invention is the provision of a lawn sprinkler which is capable of achieving all of the advantages of both the rotary type lawn sprinklers and stationary diffusing head type sprinklers.

Another object of the present invention is the provision of a lawn sprinkler including a rotary sprinkler head having orbital nozzle assemblies and stationary spray openings embodied therein and improved means for selectively directing the flow of water through one, any combination, or all of the outlets so as to afford the user a variety of patterns and types of water distribution within the patterns.

Still another object of the present invention is the provision of a lawn sprinkler which is capable of being adjusted to provide five separate water application and distribution patterns: one, providing maximum diameter coverage within a circular pattern with relatively light application of water; two, a minimum diameter circular coverage with a maximum water application; three, an intermediate diameter circular coverage with an intermediate water application; four, a small diameter circular coverage with a gentle diffused distribution; and five, a semi-circular coverage with a gentle diffused distribution.

Another object of the present invention is the provision of a sprinkler having a rotary head provided with improved nozzle assemblies capable of being adjusted to determine the rotational speed of the head and the diameter of the watering area to suit the particular need of the user.

Still another object of the present invention is the provision of a lawn sprinkler having a rotary head provided with nozzle assemblies which are capable of adjustment not only to determine the rotational speed and the diameter of the water pattern but which are also adjustable to determine the type of water stream issuing therefrom so that the user may obtain either a fog-type water stream or a jet-type stream from the head.

Still another object of the present invention is the provision of a lawn sprinkler of the type described which is simple in construction, effective and versatile in operation and economical to manufacture.

Still another object of the present invention is the provision of a lawn sprinkler of the type described having an improved base structure which enables the sprinkler to be readily moved into different operative positions on the lawn and also permits the sprinkler to be easily stored.

Still another object of the present invention is the provision of a lawn sprinkler of the type described having an improved valve mechanism embodied therein for determining the particular type of spray desired.

These and other objects of the present invention will become more apparent during the course of the following detailed description and appended claims.

The invention may best be understood with reference to the accompanying drawings wherein an illustrative embodiment is shown.

Figure 1:
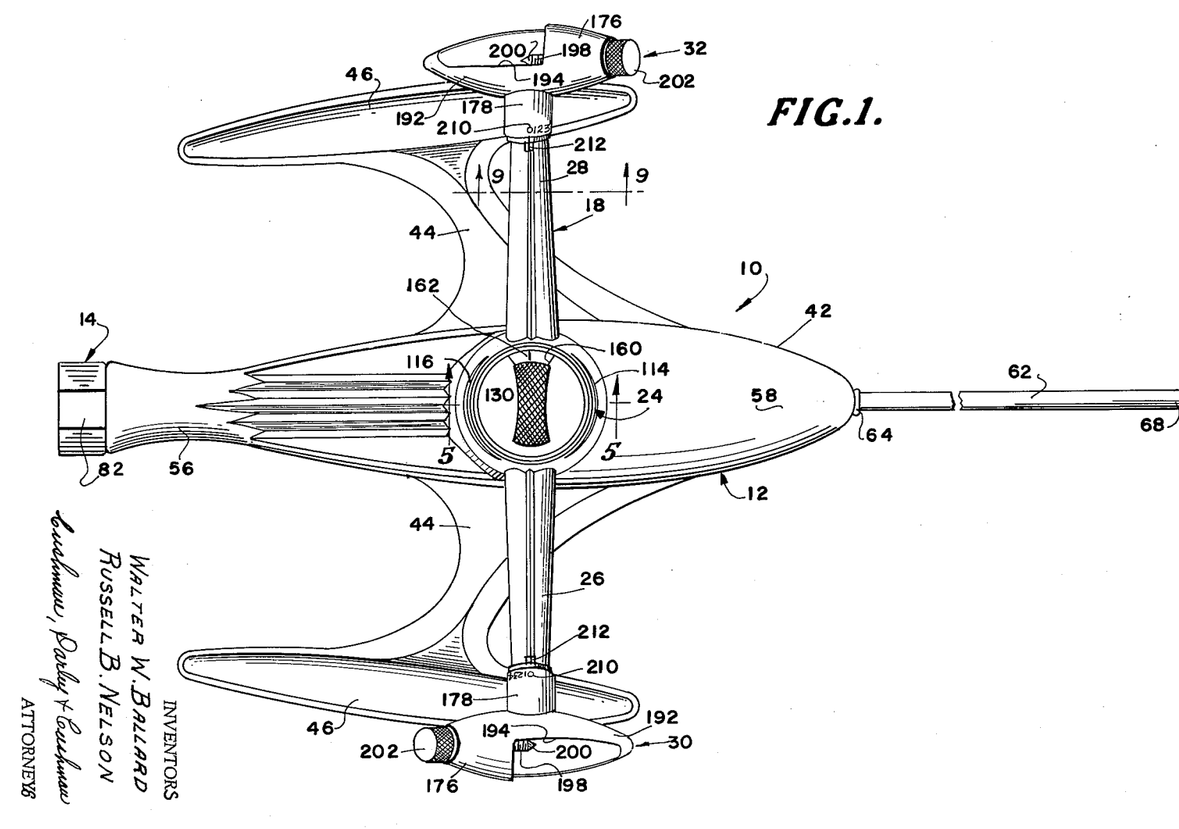
FIGURE 1 is a top plan view of a lawn sprinkler embodying the principles of the present invention.
Figure 2:
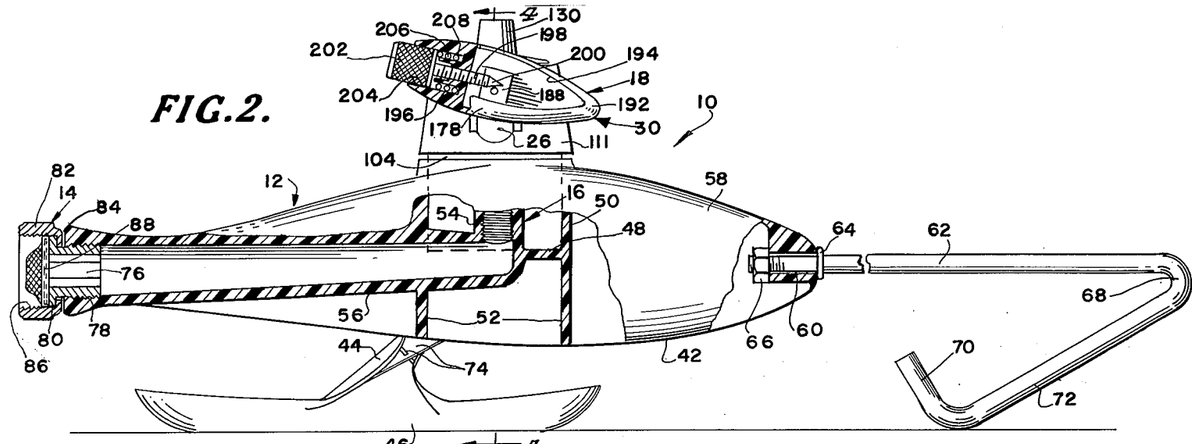
FIGURE 2 is a side elevational view of the lawn sprinkler with certain parts broken away for purposes of clearer illustration.
Figure 3:
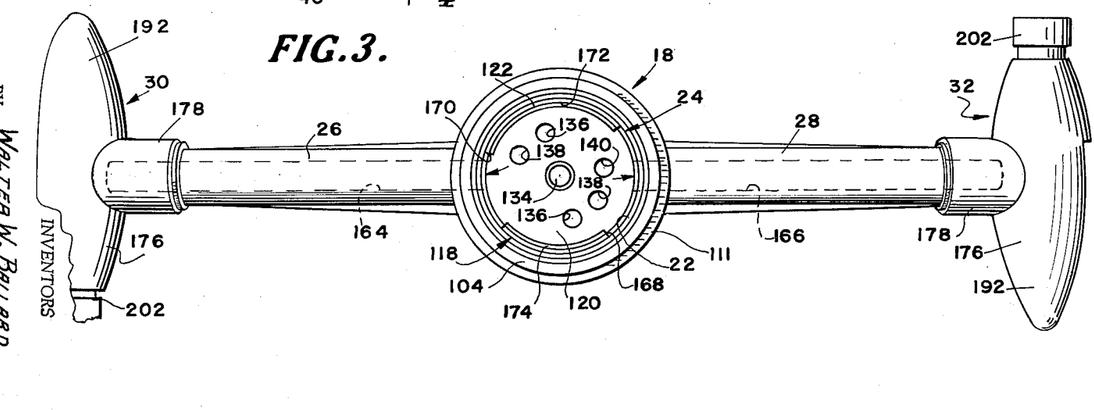
FIGURE 3 is a bottom view of the sprinkler head.

Referring now more particularly to the drawings, there is shown in FIGURES 1 and 2 a lawn sprinkler, generally indicated at 10, which embodies the principles of the present invention. The lawn sprinkler 10 includes a sprinkler base generally indicated at 12, having a water inlet assembly, generally indicated at 14, disposed on the rearward end thereof and a central upwardly extending water outlet 16. A sprinkler head, 18, is mounted on the sprinkler base 10 in water tight communication with the outlet 16 thereof for rotation about a vertical axis by a journal assembly, generally indicated at 20. The sprinkler head 18 includes a central water distribution chamber 22 which communicates with the water outlet 16 through the journal assembly 20. Mounted within the chamber 22 is a valve assembly, generally indicated at 24, for selectively directing the water within the chamber 22 to either one or both of a pair of generally radially outwardly extending arms 26 and 28 formed on the sprinkler head and/or to either one or both of a pair of central water distribution openings 34 and 36. The outer ends of the arms 26 and 28 are provided with adjustable nozzle assemblies, generally indicated at 30 and 32 respectively, for controlling the characteristic of the stream of water issuing therefrom while diffusing surfaces 38 and 40 are disposed in the path of the water stream issuing from the openings 34 and 36 respectively to diffuse these streams into two complementary semi-circular patterns on the ground.

The sprinkler base 12 may be of any suitable construction and, as shown, preferably includes a main one-piece casting of a suitable plastic material providing an elongated body 42 having a pair of arms 44 extending outwardly therefrom in a rearwardly and downwardly direction. Formed on the outer ends of the arms 44 are ground engaging runners 46. The body 42 includes a central horizontal wall portion 48 having an annular wall portion 50 extending upwardly therefrom and a pair of transverse reinforcing wall portions 52 extending downwardly therefrom. Extending upwardly from the central portion of the wall portion 48 is a conduit section or tubular wall portion 54 which forms the water outlet 16 of the base 12. The conduit section 54 communicates at its lower end with the forward end of a conduit section 56 which extends horizontally and rearwardly therefrom to the rear of the body 42.

It will be noted that the exterior periphery of the rearward portion of the conduit section 56 forms the exterior periphery of the body 42 and that the middle and forward portions thereof are provided by an exterior wall portion of any suitable shape, as indicated at 58. It will be noted that the forward portion of the exterior wall portion 58 is mounted at its forward extremity and provided with an enlarged portion having a horizontally extending opening 60 formed therein. Mounted within the opening 60 is the rearward end of a rod 62. Preferably, the rod is detachably secured to the body 42 by any suitable means, such as an integral shoulder 64 formed on the rod to engage the forward extremity of the body 42 and a nut 66 arranged to threadedly engage the rearward extremity of the rod. The rod 62 extends forwardly of the base and then is bent rearwardly and downwardly, as indicated at 68, and has its extremity turned up, as indicated at 70, so as to provide a runner portion 72 which is adapted to engage the ground during operation to provide a more stable support for the device.

The arms 44 are preferably formed of a concavo-convex sectional configuration to provide a maximum strength with a minimum utilization of materials. To provide additional strnegth, the central portions of the legs may be formed with generally vertically extending reinforcing rib portions 74. The runners 46 likewise are provided with a configuration which will afford a maximum strength with a minimum amount of material and, as shown, are formed in the shape of a flat-bottomed canoe.

As best shown in FIGURE 2, the water inlet assembly 14 is connected to the rearward end of the conduit section 56. As shown, the assembly 14 includes a tubular member 76 having an exterior portion threadedly engaged within the extremity of the conduit section 56, as indicated at 78. The member 76 also includes a radially outwardly extending annular flange 80 which is disposed outwardly of the extremity of the conduit section 56 and upon which a female hose coupling sleeve 82 is rotatably mounted. The sleeve 82 includes an inwardly extending annular flange 84 which is arranged to engage between the flange 80 and the extremity of the conduit section 56 and is interiorly threaded, as indicated at 86, to receive a conventional male hose coupling. Preferably, a filter type washer unit 88 is mounted within the sleeve 82.

Figure 4:
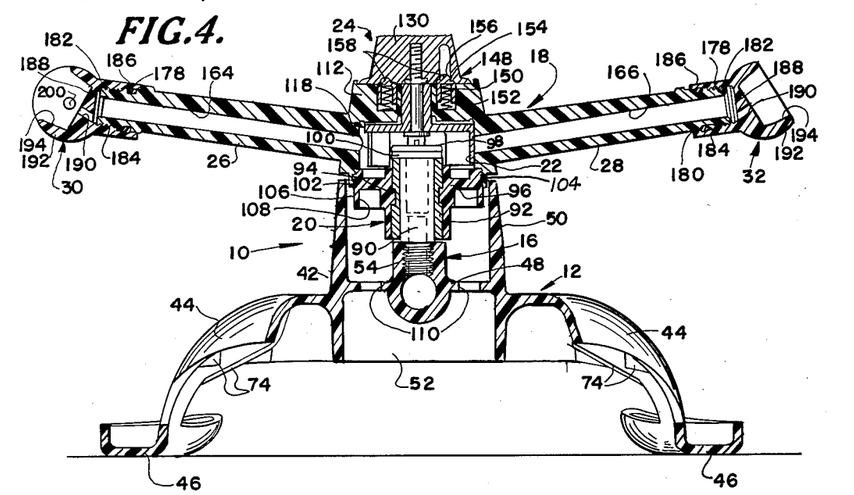
FIGURE 4 is a cross-sectional view taken along the line 4—4 of FIGURE 2.
Figure 5:
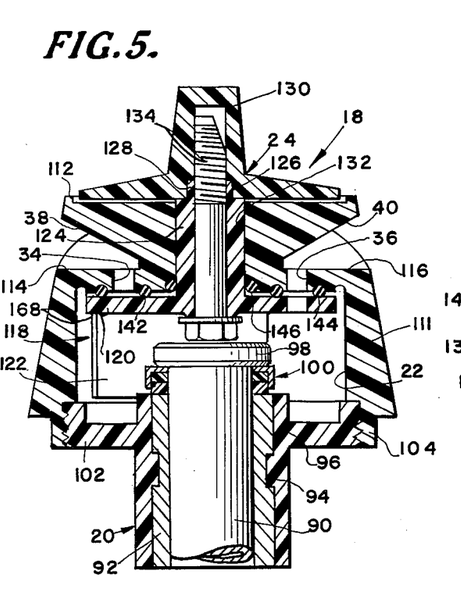
FIGURE 5 is an enlarged fragmentary cross-sectional view taken along the line 5—5 of FIGURE 1.

Referring now more particularly to FIGURES 4 and 5, the journal assembly 20 comprises a stationary tubular bearing member 90 having its lower end exteriorly threaded for engagement within the outlet conduit section 54. The tubular member is preferably formed of a bearing material such as brass or the like and receives a cooperating bearing sleeve 92 which also is preferably formed of a bearing material, such as brass or the like. The sleeve bearing 92 has an annular groove 94 formed therein which is arranged to fixedly receive a portion of a head mounting member 96. The member 96 is preferably molded of a plastic material around the bearing sleeve so as to be integrally fixed with respect thereto, the annular groove 94 enhancing the bond between the two members. The bearing sleeve 92 is retained on the tubular bearing member 90 by any suitable means and, as shown, the tubular member 90 includes an annular flange 98 extending radially outwardly from the upper end thereof. A suitable washer assembly, indicated at 100, is mounted between the flange and the upper end of the sleeve.

It can be seen that the journal assembly 20 is secured to the base by first sliding the washer assembly 100 onto the tubular member into engagement with the flange, then passing the bearing sleeve onto the tubular member and finally threadedly engaging the lower end of the tubular member within the conduit portion 54. To this end, the interior periphery of the upper portion of the tubular member may be provided with a hexagonal configuration to receive a suitable tool or the like to affect the above-mentioned threaded engagement.

The head mounting member 96 includes an integral radially outwardly extending flange 102 which is exteriorly threaded to receive the sprinkler head 18. To this end, the head 18 includes a depending skirt portion 104 which is interiorly threaded to engage the exterior threads of the head mounting member. As shown in FIGURE 4, the circular skirt portion 104 of the sprinkler head is arranged to engage within the circular wall portion 50 of the base and in order to affect the threaded assembly of the sprinkler head onto the head receiving member, the latter is provided with a pair of diametrically opposed boss portions 106, each of which has an opening 108 formed in the lower end thereof. The horizontal wall portion 48 of the body 42 is provided with a pair of registering openings 110 through which suitable tools may be extended to engage within the openings 108. In this way, the head receiving member 96 can be held against rotation with respect to the sprinkler base and the sprinkler head can be simply threadedly engaged thereon.

It will be noted that the water distribution chamber 22 is frusto-conical in shape, having its axis coincident with the axis of rotation of the head. The lower end of the chamber is defined by the head receiving member 96. The head itself includes a peripheral wall portion 111 of frusto-conical shape extending upwardly from the skirt portion 104 which defines the peripheral wall portion of the chamber. Joined with the peripheral wall portion 111 is an upper end wall portion 112 which defines the upper end of the chamber 22. The arcuate diffuser surfaces 38 and 40 are formed in the upper end wall portion 112 by crescent-shaped notches 114 and 116 formed therein, the openings 34 and 36 extending vertically through the upper end wall portion at positions below the surfaces 38 and 40.

Figure 6:
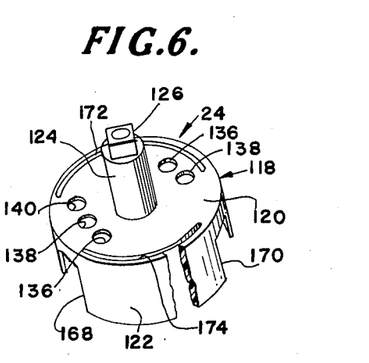
FIGURE 6 is a perspective view of the valve member of the sprinkler.
Figure 7:
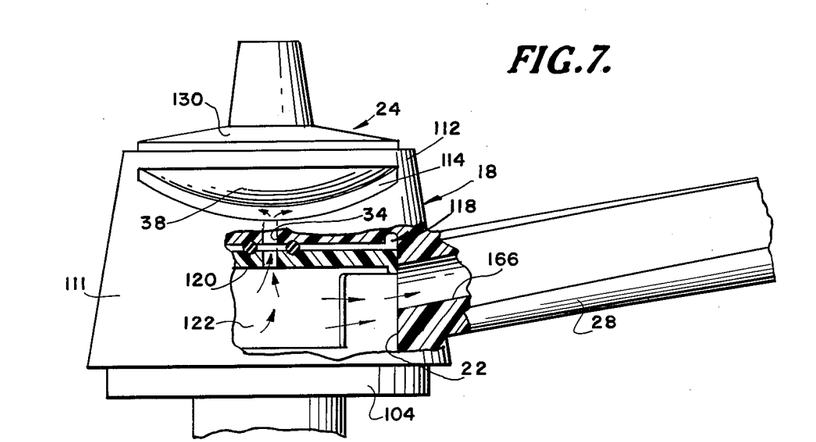
FIGURE 7 is an enlarged fragmentary elevational view of the sprinkler head with certain parts broken away for purposes of clearer illustration.

As best shown in FIGURES 4–6, the valve assembly 24 comprises a valve member 118 including a disc-shaped wall portion 120 having an annular skirt portion 122 extending downwardly from the outer periphery thereof and a hollow shaft portion 124 extending upwardly from the center thereof. The upper extremity of the hollow shaft 124 is formed with a non-cylindrical exterior periphery, as indicated at 126, for engagement within an opening 128 formed in the central lower portion of a dial member 130 forming part of the valve assembly 24. It can be seen that the valve member 118 is arranged to be disposed within the chamber 22 with the skirt portion 122 engaging the peripheral wall of the chamber, the disc-shaped wall portion 120 disposed adjacent the upper end of the chamber and the hollow shaft 124 extending through an opening 132 formed centrally in the upper end wall portion 112. The valve member 118 and dial member 130 are retained in fixed cooperating relation by any suitable means, such as a bolt 134 extending through the hollow shaft 124 and threadedly engaged within the dial member 130.

In order to control the flow of water from the chamber 22 through the openings 34 and 36, the disc-shaped wall 120 of the valve member is provided with two pairs of diametrically opposed openings 136 and 138 and a single opening 140, the axis of the openings being disposed an equal distance from the axis of rotation of the valve member about the shaft 124. Preferably, a pair of O-ring seals 142 and 144 are mounted within the upper end wall portion 112 of the sprinkler head in surrounding relation to the openings 34 and 36 respectively in a position to engage the upper surface of the disc like wall portion 120 of the valve member. In addition, an O-ring seal 146 may be formed in the surface defining the opening 132 so as to engage the exterior periphery of the hollow shaft portion 124 adjacent its connection with the disc-shaped wall portion 120.

The valve assembly 24 also includes indexing means, generally indicated at 148, for yieldingly retaining the dial member and hence the valve member fixed thereto within any one of ten different positions of rotational adjustment with respect to the sprinkler head 18. As shown, a pair of indexing means is provided in diametrically opposed relation within the upper end wall portion 112 of the sprinkler head and each includes a cylindrical indexing member 150 mounted within an opening 152 for sliding movement with respect thereto. Each indexing member includes an opening communicating with the lower end thereof for receiving the upper end of a coil spring 154, the lower end of which engages the bottom of the associated opening 152. The upper end of each indexing member includes a dome-like portion 156 which is arranged to engage within one of a series of ten dome-receiving depressions 158 formed in the lower surface of the dial member in equally spaced circumferential relation about the axis thereof. As best shown in FIGURE 1, the dial member includes a notch 160 formed in the periphery thereof through which may be viewed any one of a series of indicia 162 formed on the upper surface of the upper end wall portion 12. The particular character of the indicia is dependent upon the particular indexed position of the dial member. However, since there are only five different settings, the numerals 1, 2, 3, 4 and 5 are repeated twice with diametrically opposed numerals being the same.

The skirt portion 122 of the valve member 118 is arranged to control the flow of water from the chamber 22 through passages 164 and 166 extending through the arms 26 and 28 respectively. To this end, the skirt portion 122 is provided with a pair of notches or cut-out portions 168 and 170. In order to provide the skirt portion with greater flexibility, a pair of arcuate slots 172 and 174 are formed in the disc-like wall portion 120 at circumferential positions staggered with respect to the cut-outs.

The inner end of each passage is communicated with the chamber 22 under the control of the valve skirt 112 and outer end of each passage is communicated with the associated nozzle assembly. Since the nozzle assemblies 30 and 32 are of identical construction, a description of one will suffice to give a clear understanding of both. As best shown in FIGURES 1, 2 and 8–10, each nozzle assembly includes a nozzle body 176 having a sleeve portion 178 formed with a cylindrical interior peripheral section 180 and a threaded interior peripheral section 182. As best shown in FIGURE 4, the threaded section 182 is arranged to engage exterior threads 184 formed on the outer extremity of the associated arm 26 or 28 and the cylindrical interior peripheral section 180 is arranged to slidably engage an O-ring seal 186 mounted in a suitable annular groove formed in the exterior periphery of the associated arm at a position spaced inwardly from the threads 184. The sleeve portion 178 of the nozzle body 176 terminates inwardly of the threads 184 in a wall portion 188 having a nozzle orifice 190 formed therein. Each nozzle body also includes a generally bullet-shaped portion 192 which is joined with the wall portion 188 at the middle thereof. The bullet-shaped portion includes a hollow cut away section, indicated at 194, which is disposed in surrounding relation with the nozzle orifice 190. The forward end of each bullet-shaped portion includes a threaded opening 196 extending axially with respect to the bullet-shaped portion through which a stream adjusting bolt 198 is threadedly engaged. One end of the bolt 198 is formed into a conical configuration, as indicated at 200, and the opposite end thereof has an enlarged cylindrical head 202 formed thereon, the exterior periphery of which is suitably knurled. The forward end of the bullet-shaped portion 192 is provided with an opening 204 arranged to receive the bolt head 202 and an annular sleeve 206 is integrally formed within the lower end of the opening to provide an annular passage for the reception of one end of a coil spring 208, the opposite end of which engages the bolt head 202.

Figures 8, 9, 10:
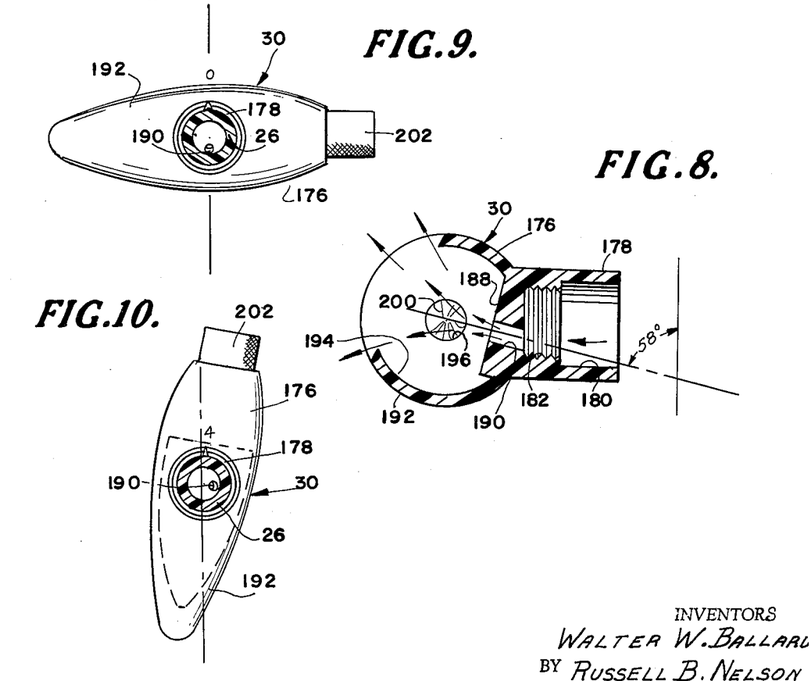
FIGURE 8 is an enlarged fragmentary cross-sectional view of one of the nozzle assemblies.
FIGURE 9 is an enlarged sectional view taken along the line 9—9 of FIGURE 1, showing the nozzle assembly in one of its operative positions.
FIGURE 10 is a view similar to FIGURE 9 showing the nozzle assembly in another of its operative positions.

As best shown in FIGURE 8, the axis of the nozzle orifice 190 describes an included angle of approximately 58° (82°, the angle of the axis of rotation minus 24°, the angle between the axis of the rotation and the axis of the orifice) with respect to the vertical or the axis of head rotation when disposed in the plane thereof and if extended, will intersect the axis of the adjusting bolt 198. It will be noted that due to the angular disposition of the nozzle orifice 190 with respect to the axis of the sleeve portion 17, that the rotative position of the sleeve with respect to the associated arm will determine the horizontal component of the water jet issuing from the nozzle opening orifice 190. Since the amount of this horizontal component determines the speed of rotation of the head, this speed can be adjusted by simply changing the rotative position of the nozzle assembly with respect to the arm. In this regard, it will be noted that the threaded connection of the nozzle assemblies on the arms provides for this rotative movement while the engagement of the O-ring seals 186 with the cylindrical sections 180 provides the necessary friction in addition to that provided by the threaded connection to yieldably retain the nozzle assemblies in any desired position of adjustment.

Preferably, the exterior periphery of the sleeve portion of the nozzle assembly is provided with indicia 210 arranged to cooperate with a pointer portion 212 formed on the upper surface of the assosiated arm. It will be seen that when the axis of the nozzle orifice is disposed in a vertical plane passange through the axis of rotation of the sprinkler head, the pointer 104 will register with a 0 speed indication. As the opposite extreme, when the axis of the orifice is disposed in a horizontal plane perpendicular to the axis of rotation, the pointer indicates a speed of 4 and there are three incremental speed indications provided by the indicia between the two extremes.

*Operation*

It will be understood that the sprinkler 10 is adapted to be connected to a source of water under pressure by a conventional garden hose by connecting the male coupling of the hose to the female connector 14. Water from the source passes through the conduit section 56 upwardly through the outlet section 54, the fixed tubular bearing member 90, then into the water distribution chamber 22. The movement of the water outwardly of the chamber 22 is controlled by the valve member 118 as determined by the setting of the dial member 130.

Referring now more particularly to FIGURES 11–15, the particular water pattern and water distribution of each of the five separate settings of the dial member 130 will now be described. However, it will be understood that while there are only five separate and distinct settings, the dial member is movable into ten different positions of adjustment. Thus, each pair of diametrically opposed positions will achieve the same water pattern and distribution although in some instances the particular passages or openings utilized to achieve the pattern will be different.

Figure 11:
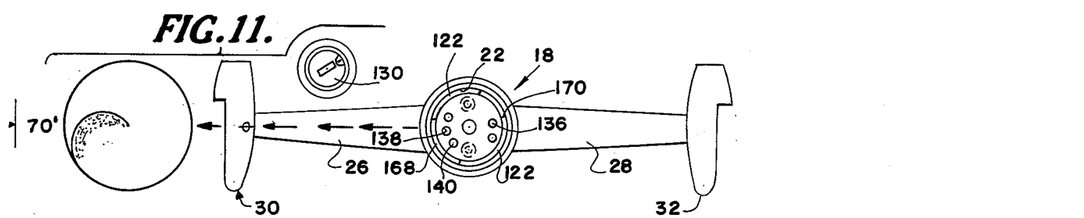
FIGURES 11–15 are composite views illustrating the five different water application and distribution patterns of the present lawn sprinkler and showing the corresponding dial and valve settings.

As shown in FIGURE 11, when the dial member 130 is in the position indicated by the indicia 1, the flow of water from the chamber 22 is outwardly through only one of the arms 26 or 28 and associated nozzle assembly 30 or 32. It will be noted that in this position, the openings 136, 138 and 140 are disposed out of registry with the openings 34 and 36 so that there will be no flow of water from the chamber 22 through either of the openings 34 and 36. It will also be noted that the skirt portion 122 covers the inner end of the passage 166 while the passage 164 associated with the arm 26 is in communication with the cut-out or notch 168. Consequently, the water within the chamber 22 can only pass outwardly through the passage 164 and outwardly through the associated nozzle assembly 30.

With the dial member in the setting 1, there will be a maximum velocity of flow through the nozzle orifice 190 of the nozzle assembly 30 and hence in this setting a maximum diameter circular pattern is possible. It is contemplated that this maximum circular pattern would have a diameter approximately 70 feet.

Figure 12:
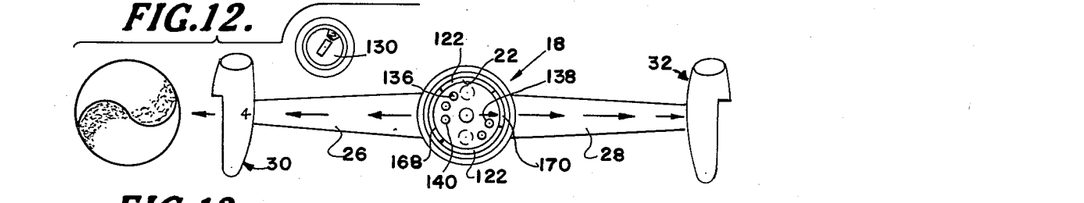

As shown in FIGURE 12, when the dial member is disposed in setting 2, the water from the chamber 22 is allowed to pass outwardly through the passages in both of the arms 26 and 28 and hence through both nozzle assemblies 30 and 32. In this setting, the velocity of the water passing from each of the nozzle orifices 190 will be less than the velocity passing through the single orifice in setting 1 so that a circular pattern is obtained which has a maximum diameter less than the maximum diameter of the circular pattern of setting 1. However, a greater quantity of water will be distributed within the smaller circular pattern in setting 2.

This action is achieved in setting 2 by virtue of the fact that none of the openings 136, 138 and 140 are in registry with the openings 34 and 36 so that passage of water outwardly through the latter is prevented. It will be noted however, that in this setting, passage 164 will still be in communication with the cut-out 168 and that the cut-out 170 has now moved into a position of communication with the passage 166.

Figure 13:
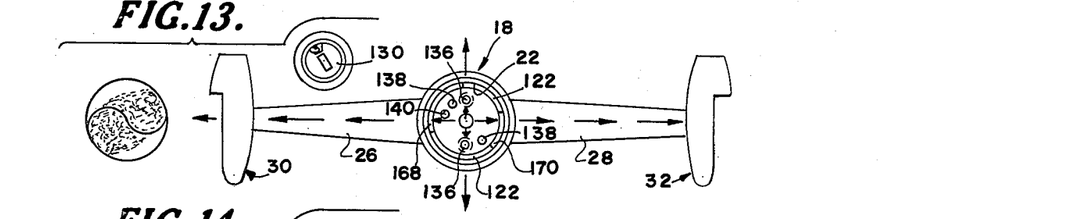

As shown in FIGURE 13, when the dial member 130 is disposed in setting 3, flow from the chamber 22 is allowed to pass outwardly through both nozzle assemblies 30 and 32 and through both of the openings 34 and 36. Consequently, in this setting the velocity of the flow through the nozzle orifices 190 will be less than in setting 2 so that a circular pattern of less diameter than the circular pattern of setting 2 is obtained. However, a greater distribution or application of water within the circular pattern will be obtained by virtue of the fact that water may pass through all of the openings provided.

This action is obtained by virtue of the fact that the pair of diametrically opposed openings 136 in the disc-like wall portion 120 has moved into registry with the openings 34 and 36 while the passages 164 and 166 remain in communication with the cut-outs 168 and 170 respectively.

It will be understood that in settings 1, 2 and 3 the sprinkler head 18 will be rotated by virtue of the horizontal component of the water jet issuing from the nozzle orifice or orifices 190. Where the nozzle assemblies simply are set at speed 1, there will be a maximum diameter coverage with a minimum speed while a speed setting of 4 will achieve a maximum rotative speed with a minimum diameter pattern. Any desirable variation between these two extremes can be obtained by an intermediate setting.

It will be understood that it is possible in setting 1 of the dial member to adjust the nozzle assembly 30 through which the water is passing so that the sprinkler head will not rotate. While such an action is possible, it is not preferred. In settings 2 and 3, it is preferred to adjust each of the nozzle assemblies to corresponding settings although here again it is possible to achieve many different variations. Again, it would be possible to set both of the nozzle assemblies so that no rotation of the head will take place.

It should also be understood that in settings 1, 2 and 3 of the dial member, the characteristic of the water stream issuing from the nozzle orifice or orifices can be varied by adjusting the bolts 198. In this regard, it will be noted that the spring 208 serves to frictionally retain the bolt into any position of adjustment desired. It will be noted that when the conical end 200 is disposed completely out of the path of the stream, the water will issue as a jet stream from the nozzle orifice 190, thus enabling the water to be applied to a maximum diameter pattern with a fairly concentrated application. On the other hand, by adjusting the bolt so that a maximum amount of the conical end 200 is disposed in the path of movement of the water stream, the stream will be broken up and diffused so as to obtain a more even light distribution of water within a circular pattern of less diameter. Any desired intermixing of these two stream conditions can be obtained by an appropriate intermediate setting of the bolt. It will also be noted that in settings 2 and 3 of the dial member, the stream adjusting bolt of one nozzle assembly can be adjusted to a setting which is the same as or different from the bolt of the other assembly and in this way, an infinite variety of water distribution within the circular patterns can be obtained within settings 2 and 3.

Figure 14:
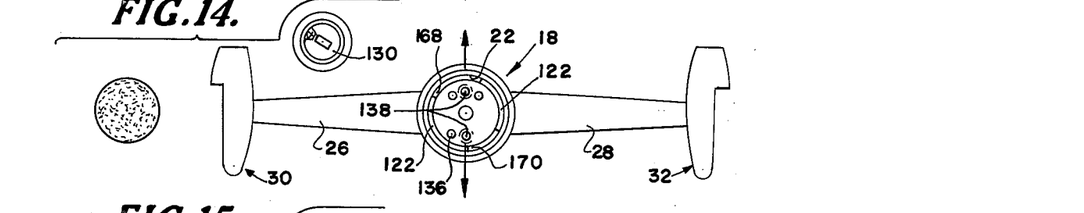

As shown in FIGURE 14, when the dial member is disposed in setting 4, the water within the chamber 22 is allowed to pass through the stationary openings 34 and 36 only. Consequently, in this setting, a gentle full circle spray will be obtained by virtue of the diffusing surfaces 38 and 40 without rotation of the sprinkler head.

It will be noted that this action is achieved by virtue of the fact that the valve skirt portion 122 has now moved into a position to cover the inner ends of both the passage 164 and the passage 166 while the pair of diametrically opposed openings 138 are now in registry with the openings 34 and 36.

Figure 15:
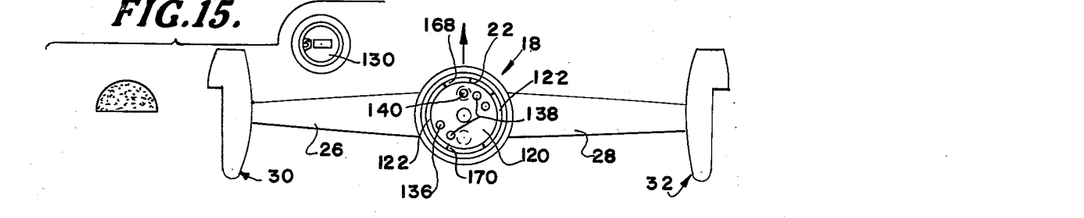

As shown in FIGURE 15, when the dial member 130 is disposed in setting 5, the water in chamber 22 is allowed to pass through only one of the openings 34 or 36. With this setting, a gentle half circle spray, suitable for walks, driveways and buildings, is obtained without rotation of the head although it will be noted that the position of the head will determine the position of the semicircular pattern.

It will be noted that this operation is obtained by virtue of the fact that the inner ends of passages 164 and 166 are both blocked by the valve skirt portion 122 whereas the opening 140 has moved into communication with the opening 34.

It can thus be seen that the device of the present invention is capable of being easily adjusted to obtain an infinite variety of circular water patterns and water distributions within such patterns by virtue of dial member settings 1, 2, 3 and 4, the adjustments of the nozzle assemblies within rotative settings 1, 2, 3 and 4 and the adjustments of the stream adjusting bolts 198. Moreover, not only can the size of the pattern be varied but it is also possible to change the shape of the pattern as by dial member setting No. 5.

The highly desirable versatility of the present device is obtained by a construction containing a minimum number of parts, the majority of which can be economically fabricated of plastic materials to obtain a desirable ornamental appearance, both as to configuration and color. The utilization of a single main base casting provides a maximum strength with a minimum amount of material and eliminates many fabrication and assembly operations previously required in producing a sprinkler base construction. The front runner rod 62 is assembled with the body of the base by the simple application of a single nut 66 and this rod provides considerable stability to the sprinkler in supporting the same on the lawn. Moreover, the hooked end 68 provides a means by which the sprinkler may be moved from one position to another on the lawn by simply attaching a string or rope thereto. In addition, the hook end 68 permits the device to be easily stored by simply hanging the device from the hook end on a suitable peg or the like.

It will also be noted that the sprinkler head may be formed of a single plastic molding and that the nozzle body may also be made of plastic moldings as well as the valve member and the dial member. The construction of the valve member 118 is regarded to be of considerable importance particularly in the provision of the slots 172 and 174. It will be noted that these slots permit the sections of the skirt portion 22 extending therebelow to have a considerable amount of arcuate radial flexibility which renders the skirt more effective to block flow through the passages 164 and 166 in settings 1, 4 and 5 of the dial member. Thus, the pressure of the water within the chamber 22 will serve to flex these sections of the skirt portion 122 into conformed engagement with the peripheral wall of the chamber 22, thus insuring an effective seal of the passages 164 and 166 without the necessity of maintaining close manufacturing tolerances.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A lawn sprinkler comprising a ground engaging base, a sprinkler head mounted on said base for rotary movement about an upright axis, said sprinkler head having means defining a central water distributing chamber formed therein, means carried by said base for communicating a source of water under pressure with said chamber, said sprinkler head including a pair of arms having passages extending therethrough the inner ends of which communicate with said chamber, said arms having orifice means communicating with the outer end portions of said passages operable to effect rotation of said head in response to flow of water outwardly therethrough, said head having a pair of openings formed therein communicating with said chamber, means carried by said head for diffusing a stream of water issuing from each of said openings, and valve means mounted within said chamber for movement into a first position operable to communicate one of said passages with said chamber and to prevent communication of the other of said passages and said openings therewith, a second position operable to communicate said passages with said chamber and to prevent communication of said openings therewith, a third position operable to communicate said passages and said openings with said chamber, a fourth position operable to communicate said openings with said chamber and to prevent communication of said passages therewith, and a fifth position operable to communicate one of said openings with said chamber and to prevent communication of the other of said openings and said passages therewith; said chamber defining means including a peripheral wall providing a surface of revolution about the axis of rotation of said head and an upper end wall, said valve member being rotatably mounted within said chamber about the axis of said peripheral wall, said passages communicating with said chamber through said peripheral wall and said openings communicating with said chamber through said upper end wall, said valve member including a disc-like portion arranged to cover one of said openings when said valve means is disposed in said fifth position and to cover both of said openings when said valve means is disposed in said first and second positions, said disc-like portion having opening means formed therein arranged to register with the other of said openings when said valve means is disposed in said fifth position and to register with both of said openings when said valve means is disposed in said third and fourth positions, said valve member also including a skirt portion arranged to cover one of said passages when said valve means is disposed in said first position and both of said passages when said valve means is disposed in said fourth and fifth positions, said skirt portion having opening means formed therein arranged to register with the other of said passages when said valve means is disposed in said first position and to register with both of said passages when said valve means is disposed in said second and third positions.

2. A lawn sprinkler as defined in claim 1 wherein said valve member skirt portion includes a pair of spaced arcuate sections, each of said sections being connected with said disc-like valve member portion at the ends thereof only so as to permit said sections to be flexed radially outwardly into conformed engagement with the surface of revolution provided by said peripheral wall in response to the water pressure within said chamber.

3. A lawn sprinkler as defined in claim 1 wherein said valve member includes a shaft portion extending upwardly from the center of the disc-like portion thereof, said upper end wall having a central opening therein rotatably receiving said shaft, a dial member fixed to the upper end of said shaft portion in a position above the upper surface of said upper end wall, spring urged indexing means operatively connected between said dial member and said upper end wall for yieldingly maintaining said dial member and hence the valve member fixed thereto in any one of said five positions, said dial member having knob means formed thereon for effecting a manual rotatable movement of said dial member and hence said valve member fixed thereto into any one of said five operative positions, and cooperating means on said dial member and said upper end wall for indicating the particular position within which said dial means is yieldably maintained by said indexing means.

4. A lawn sprinkler comprising a ground engaging base, a sprinkler head mounted on said base for rotary movement about an upright axis, said sprinkler head having means defining a central water distributing chamber formed therein, means carried by said base for communicating a source of water under pressure with said chamber, said sprinkler head including a pair of arms having passages extending therethrough the inner ends of which communicate with said chamber, said arms having orifice means communicating with the outer end portions of said passages operable to effect rotation of said head in response to flow of water outwardly there through, said head having a pair of openings formed therein communicating with said chamber, means carried by said head for diffusing a stream of water issuing from each of said openings, and valve means mounted within said chamber for movement into a first position operable to communicate one of said passages with said chamber and to prevent communication of the other of said passages and said openings therewith, a second position operable to communicate said passages with said chamber and to prevent communication of said openings therewith, a third position operable to communicate said passages and said openings with said chamber, a fourth position operable to communicate said openings with said chamber and to prevent communication of said passages therewith, and a fifth position operable to communicate one of said openings with said chamber and to prevent communication of the other of said openings and said passages therewith, and including a nozzle assembly carried by the outer end of each of said arms, each of said nozzle assemblies including a nozzle head having a nozzle orifice formed therein constituting said orifice means, means mounting said nozzle body on the associated arm for rotary movement about an axis disposed at an angle with respect to the axis of the associated orifice into different positions of adjustment between a first position wherein the axis of the orifice is disposed in a plane passing through the axis of rotation of said head and a second position wherein the axis of the orifice is disposed in a plane perpendicular to the axis of said head, a stream diffusing member carried by said nozzle body for movement into different positions of adjustment between a first position disposed out of the path of a stream of water issuing from the orifice so as to permit the latter to flow outwardly from the orifice in a jet-like spray and a second position disposed within the path of movement of the stream issuing from the orifice so as to diffuse substantially the entire stream into a fog-like spray.

5. A lawn sprinkler comprising a ground engaging base, a sprinkler head mounted on said base for rotary movement about an upright axis, said sprinkler head having means defining a central water distributing chamber formed therein, means carried by said base for communicating a source of water under pressure with said chamber, said sprinkler head including a pair of arms having passages extending therethrough the inner ends of which communicate with said chamber, said arms having orifice means communicating with the outer end portions of said passages operable to effect rotation of said head in response to flow of water outwardly therethrough, said head having a pair of openings formed therein communicating with said chamber, means carried by said head for diffusing a stream of water issuing from each of said openings, and valve means mounted within said chamber for movement into a first position operable to communicate one of said passages with said chamber and to prevent communication of the other of said passages and said openings therewith, a second position operable to communicate said passages with said chamber and to prevent communication of said openings therewith, a third position operable to communicate said passages and said openings with said chamber, a fourth position operable to communicate said openings with said chamber and to prevent communication of said passages therewith, and a fifth position operable to communicate one of said openings with said chamber and to prevent communication of the other of said openings and said passages therewith; said ground engaging base comprising an elongated sprinkler base body, a pair of sprinkler base arms extending outwardly and downwardly from said sprinkler base body, a pair of ground engaging runners on the free ends of said sprinkler base arms, said sprinkler base body, arms and runners being formed integrally of a plastic material, said sprinkler base body including a central horizontal wall portion, a water outlet conduit section extending upwardly from said central wall portion, a generally horizontally extending inlet conduit section communicating with the lower end of said outlet conduit section and extending rearwardly therefrom, a hose coupling unit connected with the rear end of said inlet conduit section, said conduit sections and said hose coupling unit comprising said means for communicating a source of water under pressure with said chamber, and an elongated rod connected at its rearward end with the forward end of said sprinkler base body and extending forwardly therefrom, the forward end portion of said rod being bent downwardly and rearwardly and then upwardly and rearwardly so as to define a ground engaging runner portion disposed forwardly and between said sprinkler base runners.

6. A lawn sprinkler comprising a ground engaging base, a sprinkler head mounted on said base for rotary movement about an upright axis, said sprinkler head having means defining a central water distributing chamber therein including an upper end wall and a peripheral wall providing a chamber defining peripheral surface of revolution about the axis of rotation of said head, means carried by said base for communicating a source of water under pressure with said chamber, said sprinkler head including a pair of arms extending outwardly from said peripheral wall, each of said arms having a passage extending therethrough the inner end of which communicates with said chamber through said peripheral wall, a nozzle assembly carried by the outer end of each of said arms, each of said nozzle assemblies including a nozzle body having a nozzle orifice formed therein, means mounting said nozzle body on the associated arm for rotary movement about an axis disposed at an angle with respect to the axis of the associated orifice into different positions of adjustment between a first position wherein the axis of the orifice is disposed in a plane passing therethrough the axis of rotation of said head and a second position wherein the axis of the orifice is disposed in a plane perpendicular to the axis of said head, a stream diffusing member carried by said nozzle body for movement into different positions of adjustment between a first position disposed out of the path of movement of a stream of water issuing from the orifice so as to permit the latter to flow outwardly from the orifice in a jet-like spray and a second position disposed within the path of movement of the stream issuing from the orifice so as to diffuse substantially the entire stream into a fog-like spray, said upper end wall having a pair of diametrically opposed generally vertically extending openings formed therein and providing an arcuate diffusing surface disposed above each of said openings for diffusing a stream of water issuing from each of said openings into a substantially semi-circular pattern on the ground, a valve member including a disc-like portion disposed below said upper end wall within said chamber, a skirt-like portion extending adjacent said peripheral wall within said chamber and a shaft portion extending upwardly from the center of said disc-like portion, said upper end wall having a central opening formed therein rotatably receiving said shaft portion, a dial member fixedly secured to the upper end of said shaft portion in a position above said upper end wall for effecting rotational movement of said valve member into any one of five different positions, spring urged indexing means operatively connected between said upper end wall and said dial member for yieldably maintaining said dial member in any one of said five positions, cooperating means between said dial member and said upper end wall for indicating the position within which said dial member is maintained by said indexing means, said disc portion being arranged to cover one of said openings when said valve member is disposed in a fifth position and to cover both of said openings when said valve member is disposed in a first position and in a second position, said disc-like portion having opening means formed therein arranged to register with the other of said openings when said valve member is disposed in said fifth position and to register with both of said openings when said valve member is disposed in a third position and a fourth position, said skirt portion being arranged to cover one of said passages when said valve member is disposed in said first position and both of said passages when said valve member is disposed in said fourth and fifth positions, said skirt portion having opening means formed therein arranged to register with the other of said passages when said valve member is disposed in said first position and to register with both of said passages when said valve member is disposed in said second and third positions.

7. A lawn sprinkler as defined in claim 6 wherein said ground engaging base comprises an elongated sprinkler base body, a pair of sprinkler base arms extending outwardly and downwardly from said sprinkler base body, a pair of ground engaging runners on the free ends of said sprinkler base arms, said sprinkler base body, arms and runners being formed integrally of a plastic material, said sprinkler base body including a central horizontal wall portion, a water outlet conduit section extending upwardly from said central wall portion, a generally horizontally extending inlet conduit section communicating with the lower end of said outlet conduit section and extending rearwardly therefrom, a hose coupling unit connected with the rear end of said inlet conduit section, said conduit sections and said hose coupling unit comprising said means for communicating a source of water under pressure with said chamber and an elongated rod connected at its rearward end with the forward end of said sprinkler base body and extending forwardly therefrom, the forward end portion of said rod being bent downwardly and rearwardly and then upwardly and rearwardly so as to define a ground engaging runner portion disposed forwardly and between said sprinkler base runners.

8. A lawn sprinkler as defined in claim 6 wherein said valve member skirt portion includes a pair of arcuate sections, each of said sections being connected with said disc-like valve member portion at the ends thereof only so as to permit said sections to be flexed radially outwardly into conformed engagement with the surface of revolution provided by said peripheral wall in response to the water pressure within said chamber.

9. A lawn sprinkler comprising a ground engaging base, a sprinkler head mounted on said base for rotary movement about an upright axis, said sprinkler head having means defining a central water distributing chamber therein including an upper end wall and a peripheral wall providing a chamber defining peripheral surface of revolution about the axis of rotation of said head, means carried by said base for communicating a source of water under pressure with said chamber, said sprinkler head including a plurality of arms extending outwardly from said peripheral wall, each of said arms having a passage extending therethrough the inner end of which communicates with said chamber through said peripheral wall, said arms having orifice means communicating with the outer end portions of said passages operable to effect rotation of said head in response to flow of water outwardly therethrough, said upper end wall having a plurality of circumferentially spaced generally vertically extending openings formed therein and providing an arcuate diffusing surface disposed above each of said openings for diffusing a stream of water issuing from each of said openings into a substantially circular segmental pattern on the ground, a valve member rotatably carried by said head in said chamber for rotation with the head and selective movement into a plurality of operative positions controlling the flow of water from said chamber to said passages and said openings, said valve member including a disc-like portion disposed below said upper end wall within said chamber to cover certain of said openings when said valve member is disposed in certain of said operative positions and having opening means formed therein operable to register with certain of said openings when said valve member is disposed in certain of said operative positions, said valve member also including a skirt portion extending adjacent said peripheral wall within said chamber to cover certain of said passages when said valve member is disposed in certain of said operative positions, said valve member also including a skirt portion extending adjacent said peripheral wall within said chamber to cover certain of said passages when said valve member is disposed in certain of said operative positions and having opening means formed therein operable to register with certain of said passages when said valve member is disposed in certain of said operative positions.

10. A lawn sprinkler comprising a ground engaging base, a sprinkler head mounted on said base for rotary movement about an upright axis, said sprinkler head having means defining a central water distributing chamber therein including an upper end wall and a peripheral wall providing a chamber defining peripheral surface of revolution about the axis of rotation of said head, means carried by said base for communicating a source of water under pressure with said chamber, said sprinkler head including a plurality of arms extending outwardly from said peripheral wall, each of said arms having a passage extending therethrough the inner end of which communicates with said chamber through said peripheral wall, said arms having orifice means communicating with the outer end portions of said passages operable to effect rotation of said head in response to flow of water outwardly therethrough, said upper end wall having a plurality of circumferentially spaced generally vertically extending openings formed therein and providing an arcuate diffusing surface disposed above each of said openings for diffusing a stream of water issuing from each of said openings into a substantially circular segmental pattern on the ground, a valve member rotatably carried by said head in said chamber for movement into a plurality of operative positions controlling the flow of water from said chamber to said passages and said openings, said valve member including a disc-like portion disposed below said upper end wall within said chamber to cover certain of said openings when said valve member is disposed in certain of said operative positions and having opening means formed therein operable to register with certain of said openings when said valve member is disposed in certain of said operative positions, said valve member also including a skirt portion extending adjacent said peripheral wall within said chamber to cover certain of said passages when said valve member is disposed in certain of said operative positions and having opening means formed therein operable to register with certain of said passages when said valve member is disposed in certain of said operative positions; said valve member skirt portion including a pair of spaced arcuate sections, each of said sections being connected with said disc-like valve member portion at the ends thereof only so as to permit said sections to be flexed radially outwardly into conformed engagement with the surface of revolution provided by said peripheral wall in response to the water pressure within said chamber.

11. A lawn sprinkler comprising a ground engaging base, a sprinkler head mounted on said base for rotary movement about an upright axis, said sprinkler head having means defining a central water chamber therein, means carried by said base for communicating a source of water under pressure with said chamber, said sprinkler head including a plurality of arms each having a passage extending therethrough the inner end of which communicates with said chamber, and a nozzle assembly carried by the outer end of each of said arms, each of said nozzle assemblies including a nozzle body having a nozzle orifice formed therein, means mounting said nozzle body on the associated arm for rotary movement about an axis disposed at an angle with respect to the axis of the associated orifice into different positions of adjustment between a first position wherein the axis of the orifice is disposed in a plane passing through the axis of rotation of said head and a second position wherein the axis of the orifice is disposed in a plane perpendicular to the axis of said head, a stream diffusing member carried by said nozzle body for movement into different positions of adjustment between a first position disposed out of the path of a stream of water issuing from the orifice so as to permit the latter to flow outwardly from the orifice in a jetlike spray and a second position disposed within the path of movement of the stream issuing from the orifice so as to diffuse substantially the entire stream into a fog-like spray; each of said nozzle bodies including a sleeve portion, each of said sleeve portions including a cylindrical interior surface section and a threaded interior section, each of said arms including an exterior thtreaded section threadedly receiving the interior threaded section of the associated sleeve portion and an O-ring seal arranged to engage the cylindrical interior surface section of the associated sleeve portion.

12. A lawn sprinkler comprising an elongated sprinkler base body, a pair of sprinkler base arms extending outwardly and downwardly from said sprinkler base body, a pair of ground engaging runners on the free ends of said sprinkler base arms, said sprinkler base body, arms and runners being formed integrally of a plastic material, said sprinkler base body including a central horizontal wall portion, a water outlet conduit section extending upwardly from said central wall portion, a generally horizontally extending inlet conduit section communicating with the lower end of said outlet conduit section and extending rearwardly therefrom, a hose coupling unit connected with the rear end of said inlet conduit section adapted to be connected to a source of water under pressure, an elongated rod connected at its rearward end with the forward end of said sprinkler base body and extending forwardly therefrom, the forward end portion of said rod being bent downwardly and rearwardly and then upwardly and rearwardly so as to define a ground engaging runner portion disposed forwardly and between said sprinkler base runners, a sprinkler head, and a tubular bearing assembly rotatably mounting said head on said sprinkler base body and communicating said water outlet conduit section with said sprinkler head; said sprinkler head including a central water chamber and a plurality of outwardly extending arms, each of said arms having a passage therethrough communicating at its inner end with said chamber, a nozzle assembly carried by the outer end of each of said arms, each of said nozzle assemblies including a nozzle head having a nozzle orifice formed therein constituting said orifice means, means mounting said nozzle body on the associated arm for rotary movement about an axis disposed at an angle with respect to the axis of the associated orifice into different positions of adjustment between a first position wherein the axis of the orifice is disposed in a plane passing through the axis of rotation of said head and a second position wherein the axis of the orifice is disposed in a plane perpendicular to the axis of said head, a stream diffusing member carried by said nozzle body for movement into different positions of adjustment between a first position disposed out of the path of a stream of water issuing from the orifice so as to permit the latter to flow outwardly from the orifice in a jet-like spray and a second position disposed within the path of movement of the stream issuing from the orifice so as to diffuse substantially the entire stream into a fog-like spray.

13. A lawn sprinkler as defined in claim 12 wherein said sprinkler head also includes a plurality of openings formed therein communicating with said chamber, means carried by said head for diffusing a stream of water issuing from each of said openings, and valve means mounted within said chamber for movement into a plurality of different operative positions to selectively control the flow of water from said chamber through said passages and said openings.

References Cited in the file of this patent

UNITED STATES PATENTS

| | | |
|---|---|---|
| 659,714 | Storm | Oct. 16, 1900 |
| 1,764,570 | Lohman | June 17, 1930 |
| 1,831,540 | Nelson | Nov. 10, 1931 |
| 2,388,093 | Smith | Oct. 30, 1945 |
| 2,532,356 | Brown et al. | Dec. 5, 1950 |
| 2,677,577 | Miller | May 4, 1954 |
| 2,683,056 | Hilfinger | July 6, 1954 |
| 2,729,504 | Zukas | Jan. 3, 1956 |
| 2,884,202 | Smith | Apr. 28, 1959 |
| 2,991,942 | Rosenkranz | July 11, 1961 |
| 2,998,197 | Kachergis | Aug. 29, 1961 |
| 3,017,123 | Rinkewich et al. | Jan. 16, 1962 |